US011681891B2

(12) United States Patent
Fabrizio et al.

(10) Patent No.: US 11,681,891 B2
(45) Date of Patent: Jun. 20, 2023

(54) ELECTRONIC MODULE FOR CHIP CARD COMPRISING A DISPLAY SCREEN

(71) Applicant: SMART PACKAGING SOLUTIONS, Rousset (FR)

(72) Inventors: Kevin Fabrizio, Rousset (FR); Guillaume Gerin, Rousset (FR)

(73) Assignee: SMART PACKAGING SOLUTIONS, Rousset (FR)

( * ) Notice: Subject to any disclaimer, the term of this patent is extended or adjusted under 35 U.S.C. 154(b) by 67 days.

(21) Appl. No.: 17/594,481

(22) PCT Filed: Apr. 17, 2020

(86) PCT No.: PCT/FR2020/000140
§ 371 (c)(1),
(2) Date: Oct. 18, 2021

(87) PCT Pub. No.: WO2020/212667
PCT Pub. Date: Oct. 22, 2020

(65) Prior Publication Data
US 2022/0207317 A1    Jun. 30, 2022

(30) Foreign Application Priority Data
Apr. 19, 2019  (FR) ...................................... 1904213

(51) Int. Cl.
*G06K 19/077*    (2006.01)
*G06K 19/07*     (2006.01)
(52) U.S. Cl.
CPC ... *G06K 19/07722* (2013.01); *G06K 19/0723* (2013.01); *G06K 19/07773* (2013.01)
(58) Field of Classification Search
CPC ......... G06K 19/07722; G06K 19/0723; G06K 19/07773
(Continued)

(56) References Cited

U.S. PATENT DOCUMENTS

2009/0200650 A1    8/2009  Tan
2017/0132507 A1    5/2017  Blythe
2019/0012588 A1    1/2019  Lalo et al.

FOREIGN PATENT DOCUMENTS

EP    3168787 A1    5/2017

OTHER PUBLICATIONS

International Search Report (PCT/ISA/210) with English translation and Written Opinion (PCT/ISA/237) dated Jul. 1, 2020, by the European Patent Office as the International Searching Authority for International Application No. PCT/FR2020/000140.

*Primary Examiner* — Allyson N Trail
(74) *Attorney, Agent, or Firm* — Buchanan Ingersoll & Rooney PC

(57) ABSTRACT

An electronic module for a chip includes a first dielectric substrate provided on one of the faces thereof with a first microelectronic chip whose input/output terminals are connected to first connection pins which are arranged around the first microelectronic chip, and a second dielectric substrate which is placed directly opposite the first substrate and which is provided on one of the faces thereof with a second microelectronic chip whose input/output terminals are connected to second connection pins which are arranged around the second microelectronic chip. The first and second microelectronic chips are arranged on the faces of the substrates directed towards the interior of the electronic module. A dielectric shim has a calibrated thickness and separates the first and second dielectric substrates. The shim has throughholes or vacancies accommodating electrically conductive materials connecting some of the first connection pins to some of the second connection pins.

14 Claims, 4 Drawing Sheets

(58) Field of Classification Search
USPC .......................................................... 235/451
See application file for complete search history.

[Fig 1]
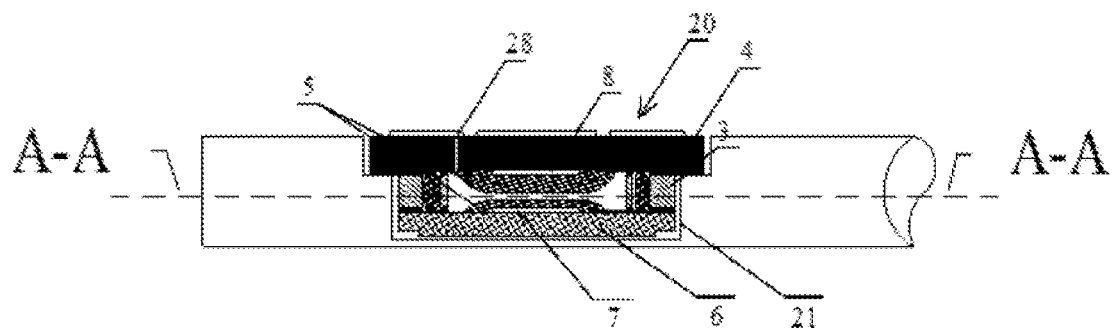
[Fig 2]
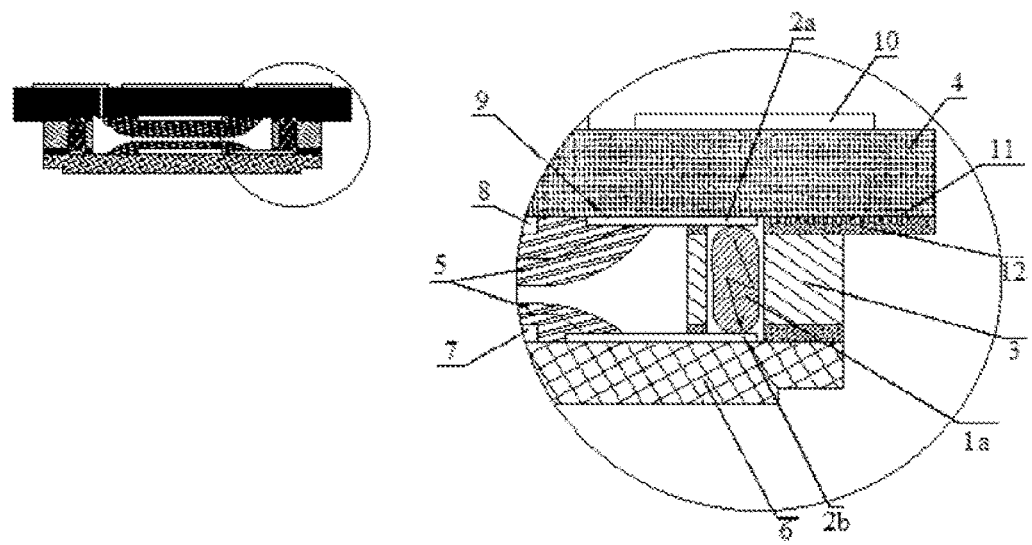
[Fig 3]
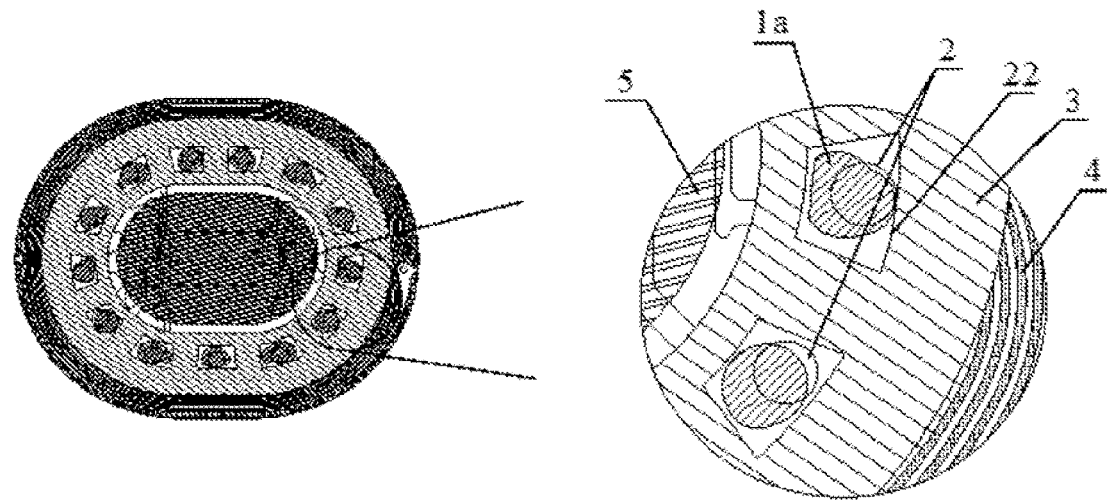

[Fig 4]
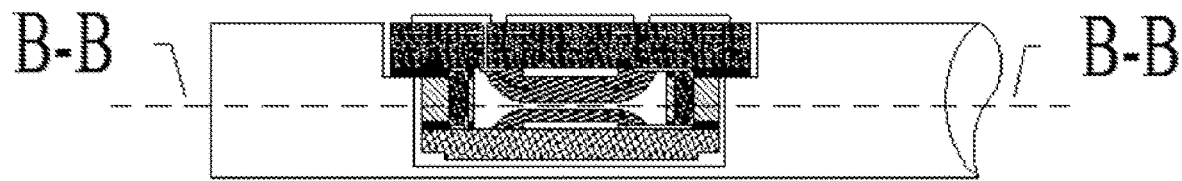
[Fig 5]
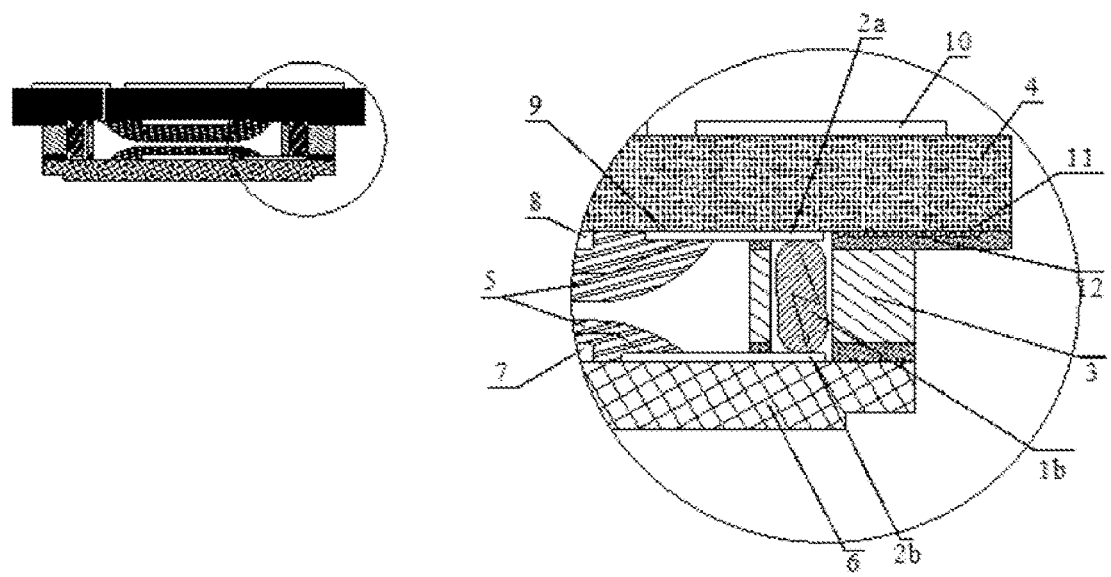
[Fig 6]
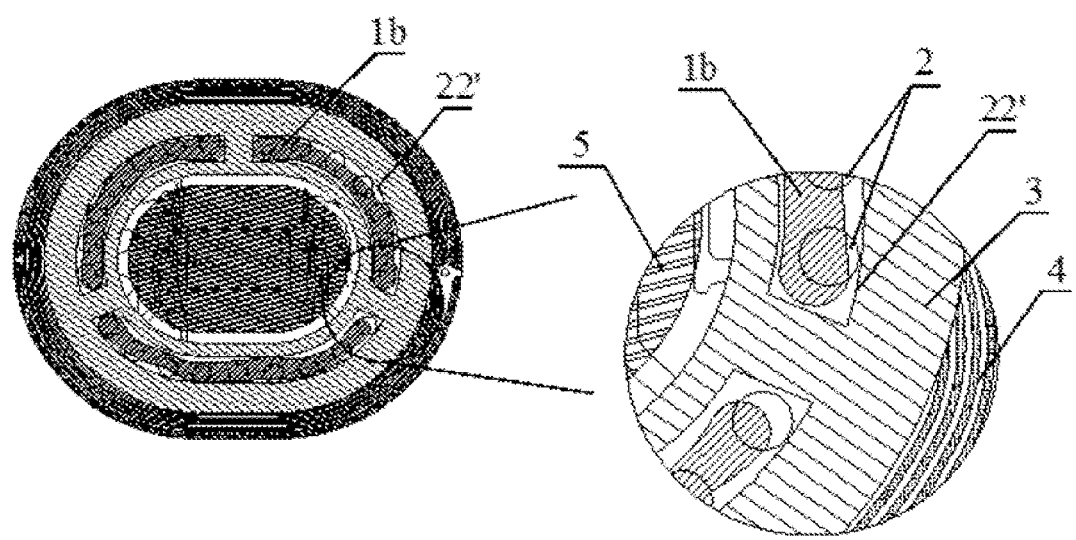

[Fig 7]
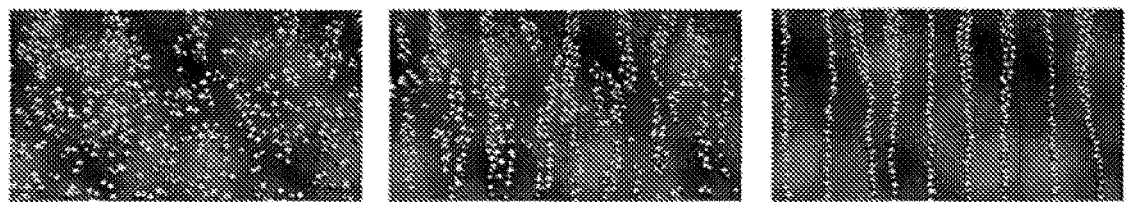
[Fig 8]
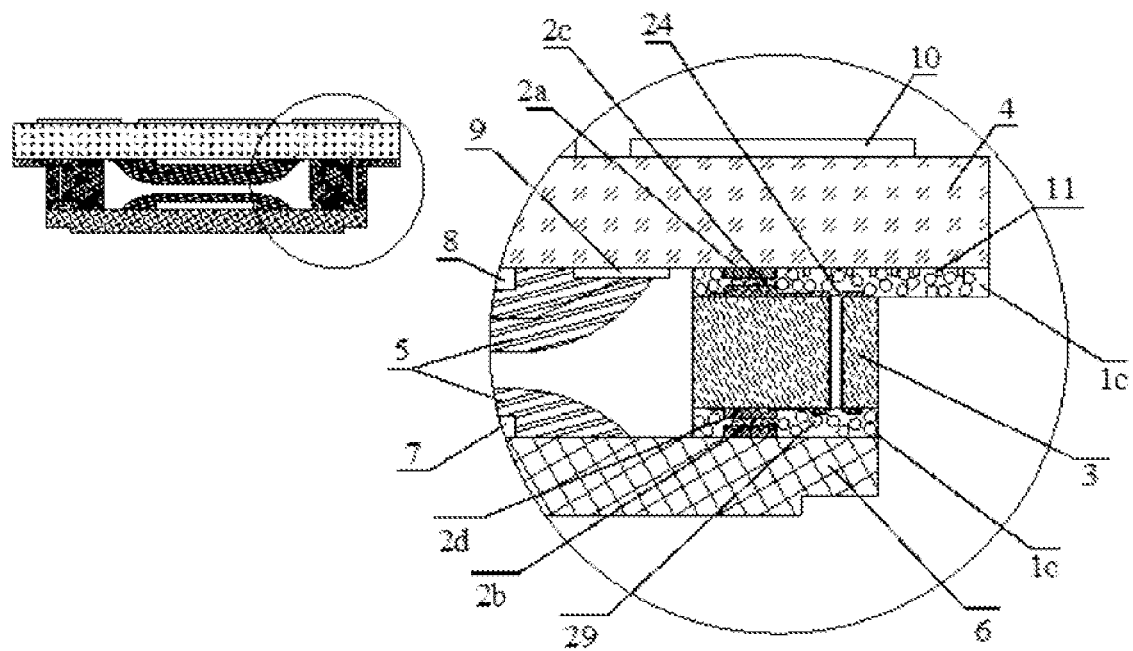

[Fig 9]
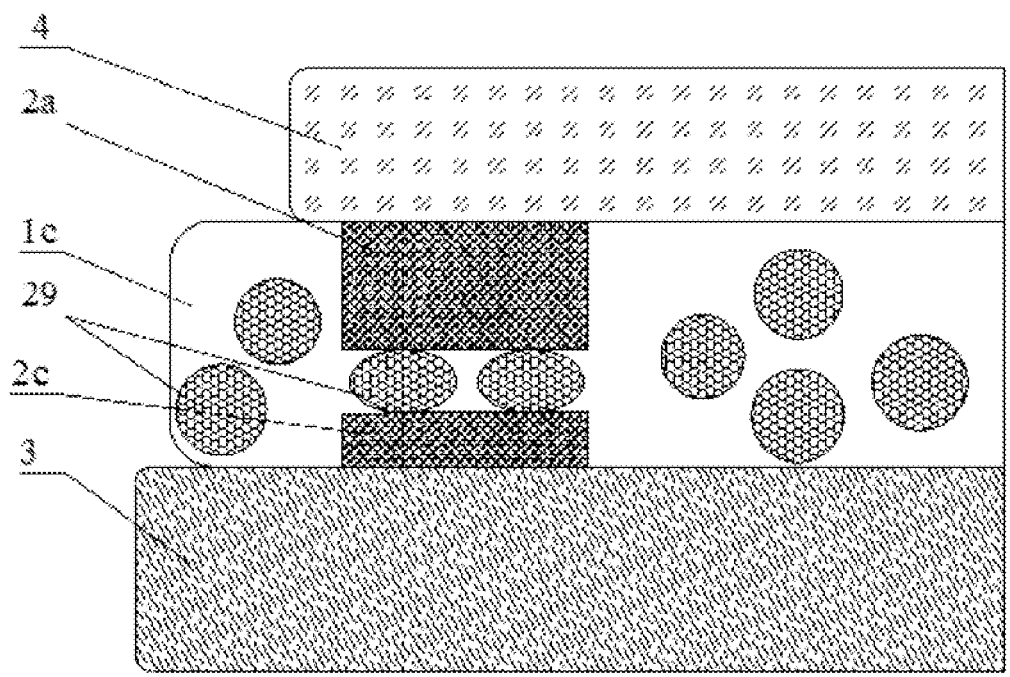
[Fig 10]
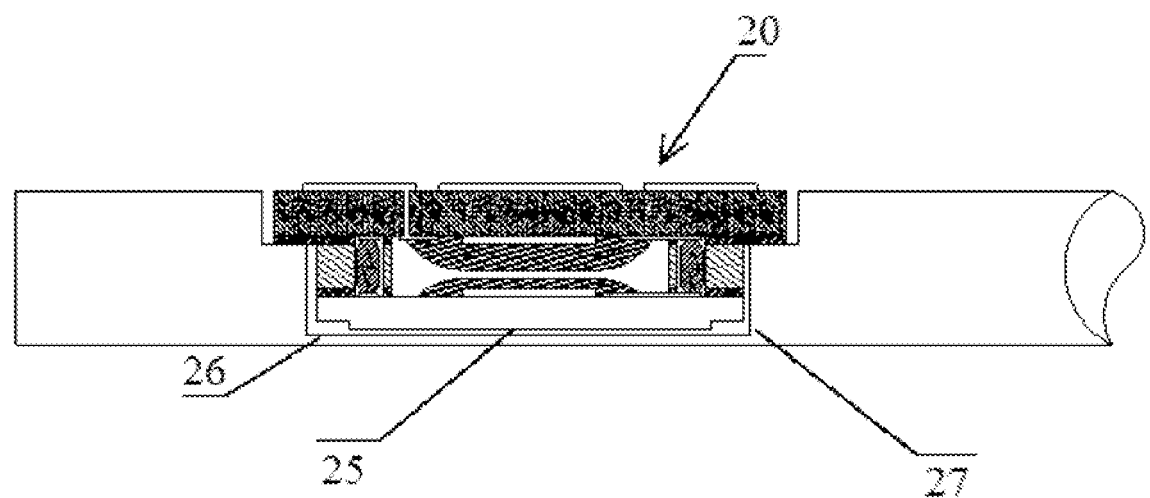

ELECTRONIC MODULE FOR CHIP CARD COMPRISING A DISPLAY SCREEN

The present invention relates to an electronic module, notably for a chip card, comprising a chip-card electronic chip, and a second electronic component such as, for example, a display on one of the faces of the module.

PRIOR ART

In order to increase the security of chip cards in some applications, notably banking applications, or for transactions on the Internet, some chip cards comprise, instead of a fixed CV ("Cardholder Verification") code, a dynamic code, referred to as a CVX code, that is displayed on a digital screen on the back of the chip card.

The screen for displaying the dynamic code is arranged in the same place as the normal fixed code, that is to say offset from the position of the electronic module of the chip card and its contact terminal block, thereby imposing, in order for the two circuits to be able to communicate with each other, the presence of a flexible printed circuit (also referred to as a "flex PCB") making the electronic connection between the display and the microcontroller of the normal electronic module of the chip card.

This solution is expensive to implement, and the presence of this flexible printed circuit making the connection between two remote electronic components exposes the chip card to the risk of the reliability of the product decreasing over time. Furthermore, a product with this architecture would be very difficult to mass-produce with an acceptable industrial yield.

Document EP 3 168 787 A1 discloses the principle of an electronic module for a chip card, which module is provided with two electronic integrated circuits that are opposite each other and arranged between a contact interface that is in accordance with the ISO standard 7816 and visible on a first face, and a screen that is visible on the second face of the module and able to display a CVX code. This arrangement of two stacked circuits makes it possible to avoid the need for a flex PCB circuit in order to connect the two circuits. Specifically, the two printed circuits, the ISO contact interface and the display screen are connected to one another by interconnections (reference signs 524, 526, 528, 530 in FIG. 5 of the document). Now, the interconnections that are shown are purely theoretical and are particularly difficult to make from an industrial point of view. Specifically, they pose a series of technical problems that are neither addressed nor solved in said document such as, for example, how to ensure a precise and constant thickness of the module despite the stacking of the integrated circuits and of the interconnections, and how to make reliable and well-positioned interconnections, knowing that the interconnection points are not visible from the outside of the module.

These various problems are not specific to well-known chip cards in ISO 7816-1 format; they would likewise arise for other products having similar functionalities and components but exhibiting a different form factor such as, for example, identity cards or electronic passports or the like. The invention will, therefore, be described in the context of a chip card by way of simplification, without this form factor being limiting.

Aim of the Invention

The general aim of the invention is to provide an electronic module and a chip card using such a module, which is able to overcome the drawbacks of the prior art.

A more specific aim of the invention is to provide a chip-card electronic module comprising, on its rear face, a second electronic component, notably a biometric sensor, or a screen, in particular for displaying a CVX code, without requiring a printed circuit between the chip-card module and the second electronic component.

Another aim of the invention is to provide an electronic module for a chip card that may be easily used for any type of chip card, be it a contact chip card directly provided, on its front face, with a contact terminal block, or an exclusively contactless chip card, or else a hybrid contact and contactless chip card.

Another aim of the invention is to provide an electronic module for a chip card the manufacture of which does not differ from a contact, contactless or dual contact and contactless communication interface module, that is to say that it may be manufactured using the same production lines as the latter.

Another aim of the invention is to provide a module structure for a chip card making it possible to make, in a simple and reliable way, the electrical interconnections between two superposed printed circuits, one of which has a contact interface on top of it and the other of which has a sensor or a screen on top of it.

Subject of the Invention

One subject of the invention is, therefore, an electronic module for a chip card comprising at least one first dielectric substrate that is provided, on one of its faces, with at least one first microelectronic chip the input/output terminals of which are connected to first connection pads that are arranged around said first microelectronic chip, and at least one second dielectric substrate that is placed directly opposite the first substrate and provided, on one of its faces, with at least one second microelectronic chip the input/output terminals of which are connected to second connection pads that are arranged around said second microelectronic chip, the first and second microelectronic chips being arranged on the faces of the substrates that are turned toward the inside of the electronic module, characterized in that it comprises a dielectric spacer of calibrated thickness separating the first and second dielectric substrates, said spacer comprising through-holes or vias opening either side onto the inner face of said substrates and in which electrically conductive materials are arranged that are able to selectively connect some of the first connection pads to some of the second connection pads.

According to one embodiment, the spacer has as many holes as there are interconnections to make between the first and second electronic chips, each of these holes having a cross-sectional area that is at least equal to the cross-sectional area of the connection pads and being filled by a dot of conductive material.

According to one embodiment, said conductive material is a conductive resin, a conductive ink, a conductive fluid, a conductive adhesive or fatty substance.

Advantageously, said conductive material is a resin or adhesive that solidifies under the effect of heat or ultraviolet rays being applied.

According to one variant embodiment, the spacer has holes in the shape of an arc the cross-sectional area of which is larger than the cross-sectional area of a plurality of adjacent connection pads, said holes being filled by an anisotropic ferromagnetic adhesive or resin that is able to make, under the effect of a magnetic field, a plurality of parallel electrical connections on an axis (Z) that is perpendicular to the dielectric substrates. In this embodiment, the electrical connections may become permanent only after a predefined magnetic field and temperature are applied. As a variant, said electrical connections may be temporary and last only as long as a magnetic field is applied.

According to one variant embodiment, said spacer comprises conductive vias the ends of which are connected to first and second electrical connection pads by means of an anisotropic conductive adhesive that conducts electricity only in a direction that is perpendicular to the substrates.

Whatever the embodiments of the spacer and of the electrical connections between the chips, said first dielectric substrate may comprise, on its outer face, which is turned toward the outside of the module, a contact terminal block, in particular according to ISO standard 7816, the contacts being connected to the first connection pads by conductive tracks that are integrated into the first substrate. Also, said first dielectric substrate comprises, on its inner face, which is turned toward the inside of the module, an antenna the ends of which are connected to the connection pads of a radiofrequency interface of the first microelectronic chip.

According to one embodiment, said second substrate comprises, on its outer face, a display screen and said second microelectronic chip is a controller that is able to control said display screen.

According to one variant embodiment, said second substrate comprises a sensor, in particular a biometric sensor, and said second microelectronic chip is a controller that is able to control said sensor.

The other subject of the invention is a chip card, characterized in that it comprises a card body that is provided with a through-cavity, and an electronic module as described above, which is fastened in said cavity so as to exhibit, on one of the faces of the chip card, a face of the first substrate and, on the other face of the chip card, a face of the second substrate of the module.

According to one variant, the chip card comprises a card body that is provided with a blind cavity exhibiting a transparent bottom, and an electronic module as described above, which is fastened in said cavity so as to exhibit, on one of the faces of the chip card, a face of the first substrate and, on the other face of the chip card, a face of the second substrate that is visible through the transparent bottom.

DETAILED DESCRIPTION

The invention will be described in more detail with reference to the attached figures, in which:

FIG. 1 shows an enlarged cross-sectional view of a first embodiment of the electronic module according to the invention;

FIG. 2 shows an enlarged view of the right-hand end of the electronic module of FIG. 1;

the left-hand portion of FIG. 3 shows a plan and cross-sectional view of the module in a cross-sectional plane A-A of FIG. 1. The right-hand portion of FIG. 3 shows an enlarged view of a portion of the left-hand portion of FIG. 3;

FIGS. 4 to 6 are views that are similar to FIGS. 1 to 3, but relate to a second embodiment of the module with a slightly modified spacer;

FIG. 7 shows a view of the distribution of electrical particles inside an anisotropic conductive adhesive at different stages of curing;

FIG. 8 shows an enlarged cross-sectional view of a third embodiment of the electronic module according to the invention;

FIG. 9 shows an enlarged view of a region of FIG. 8 corresponding to the connection by anisotropic conductive adhesive;

FIG. 10 shows a cross-sectional view of a chip card using an electronic module in accordance with the invention.

Reference is made to FIGS. 1 to 3, which relate to a first embodiment of the invention. A module 20 for a chip card is inserted into a cavity 21 of a card body, or into an equivalent holder with a form factor that is different from the standardized card bodies according to the ISO standard 7816. The module 20 comprises a first dielectric substrate 4 on one face of the module, typically the face referred to as the upper face, and a second dielectric substrate 6 that is arranged on the other face of the module, typically the lower face. A first microelectronic chip 8, of the same type as well-known chip-card chips, is fastened on the face of the first substrate 4 that is oriented toward the inside of the module. Likewise, a second microelectronic chip 7 is fastened on the face of the second substrate 6 that is oriented toward the inside of the module. The two chips 7, 8 are coated and protected by a coating resin 5.

In the example that is shown, the first chip 8 is a dual contact and contactless chip. As a result, it comprises some input/output terminals 9 that are connected to a contact terminal block 10 via conductive tracks or vias 28 passing through the first substrate 4, and some input/output terminals 9 that are connected to the ends of an antenna 11 that is arranged on the inner face of the substrate 4.

In order to separate the two chips 7, 8 from each other, the module 20 comprises a spacer 3 that is inserted between the two substrates 4, 6. The inner faces of the two substrates are adhesively bonded onto the spacer by means of a layer of adhesive 12, typically an adhesive referred to as a "hot-melt" adhesive.

The spacer 3 comprises through-holes 22 that open either side onto the inner face of the two substrates 4, 6. In these places, the first substrate 4 comprises, on its inner face, first connection pads 2a that are connected to input/output terminals 9 of the first chip 8 by electrical connections. Likewise, the second substrate 6 comprises, on its inner face, second connection pads 2b that are connected to input/output terminals 9 of the second chip 7 by electrical connections.

According to the invention, the respective connection pads 2a, 2b of the two substrates 4, 6 are located opposite each other, thereby making it possible to connect them in pairs via dots 1a of conductive material that are distributed into the holes 22 of the spacer 3 before the module is assembled, as may be clearly seen in FIGS. 2 and 3A, 3B. It should be noted that the cross-sectional area of the through-holes is slightly larger than the size of the connection pads 2a, 2b and than the cross-sectional area of the dots 1a of conductive material, thereby making it possible without fail to position the dots of conductive material right opposite the connection pads, despite the position tolerances that are due to the manufacturing tolerances.

In a second embodiment corresponding to FIGS. 4 to 7, the shape of the spacer 3 has changed slightly, the holes 22 being replaced by three through-arches 22', and the cylindrical conductive dots 1a being replaced by conductive dots 1b in the shape of an arc that are arranged opposite a plurality of connection pads 2a, 2b. In this case, the cross-sectional area of the holes of the spacer and the surface area of the conductive dots 1b encompass the cross-sectional area of a plurality of connection pads 2a, 2b, thereby simplifying the manufacture of the module. However, in the absence of additional precautions, this would short-circuit a plurality of connection pads. In order to avoid a short-circuit between adjacent pads, use is then made, for the conductive dots 1b, of a ferromagnetic conductive adhesive, which gradually becomes conductive in a direction that is directed between the pads 2a, 2b perpendicular to the plane of the substrates, from the moment when an appropriate crosslinking temperature and magnetic field are applied, as schematically shown in FIG. 7. The development of the ferromagnetic adhesive is shown from the left to the right of FIG. 7, and the ferromagnetic conductive adhesive becomes permanently conductive at the end of the crosslinking temperature and magnetic field being applied. In this way, a given pair of pads 2a, 2b are electrically connected, but the adjacent pads 2a (and 2b, respectively) are not short-circuited.

In the third embodiment corresponding to FIGS. 8 and 9, the spacer 3 comprises conductive vias 24 the ends of which are connected to first and second electrical connection pads 2c, 2d by means of an anisotropic conductive adhesive 1c that conducts current only in a direction that is perpendicular to the substrates. In order to do this, the conductive material 1c comprises conductive particles that are randomly dispersed at first, but which align in a direction that is perpendicular to the plane of the two substrates during a curing phase of a few seconds, as schematically shown in FIG. 9. More specifically, when a pressure and a temperature come to be applied, the thickness of the adhesive 1c bleeds in order to reveal, at the surface, the conductive particles, thus ensuring a connection only on the vertical axis Z, the conductive particles passing all the way through the adhesive after the pressure and temperature parameters are applied. At the end of this treatment, the conductive material is exhibits permanent conductive lines connecting the connection pads 2a and 2c, and also 2b and 2d, in pairs on either side of the spacer 3.

Advantages of the Invention

The invention meets the aims that were set and, in particular, makes it possible to obtain a module for a chip card that is provided with two electronic components that are located opposite each other on two substrates, one of which, on the lower portion of the module, is housed in the vicinity of the bottom of the cavity of the chip card.

The calibrated spacer that is arranged between the two substrates makes it possible both to control the thickness of the module and to provide holes or vias for the electrical connections between the two electronic components to pass through. This arrangement makes it possible, without using a connecting printed circuit, to significantly expand the functionalities of the module while at the same time reusing the known methods for manufacturing chip cards by embedding a module in a cavity of a card body, which methods are particularly well-understood and inexpensive.

Furthermore, it is possible to supply electric power to the second electronic chip 7 from the power supply circuit of the first chip 8, thereby making it possible not to resort to a battery in order to supply power to the second chip.

The new module according to the invention remains compatible both with inductive coupling technologies, that is to say those using a contactless chip that is electromagnetically coupled with a large antenna that is arranged in the card body, and with technologies referred to as wired technologies, in which the chip of the chip card is connected by a galvanic connection to a large antenna that is arranged in the card body.

In addition, the second electronic component 7 may be of many different sorts (sensors, screen, etc.), thereby making it possible to use this new module for a very great variety of use cases.

The invention claimed is:

1. An electronic module for a chip card comprising at least one first dielectric substrate that is provided, on one of its faces, with at least one first microelectronic chip having input/output terminals which are connected to first connection pads that are arranged around said first microelectronic chip, and at least one second dielectric substrate that is placed directly opposite the first substrate and provided, on one of its faces, with at least one second microelectronic chip having input/output terminals of which are connected to second connection pads that are arranged around said second microelectronic chip, the first and second microelectronic chips being arranged on the faces of the substrates that are turned toward the inside of the electronic module, and further comprising a dielectric spacer of calibrated thickness separating the first and second dielectric substrates said spacer comprising through-holes or vias opening either side onto the inner face of said substrates and in which electrically conductive materials are arranged for connecting some of the first connection pads to some of the second connection pads.

2. The electronic module as claimed in claim 1, wherein the spacer has as many holes as there are interconnections to make between the first and second electronic chips, each of these holes having a cross-sectional area that is at least equal to the cross-sectional area of the connection pads and being filled by a dot of conductive material.

3. The electronic module as claimed in claim 2, wherein said conductive material is a conductive resin, a conductive ink, a conductive fluid, a conductive adhesive or fatty substance.

4. The electronic module as claimed in claim 2, wherein said conductive material is a resin or adhesive that solidifies under the effect of heat or ultraviolet rays being applied.

5. The electronic module as claimed in claim 1, wherein the spacer has holes in the shape of an arc, the cross-sectional area of which is larger than the cross-sectional area of a plurality of adjacent connection pads, said holes being filled by an anisotropic ferromagnetic adhesive or resin that is able to make, under the effect of a magnetic field, a plurality of parallel electrical connections on an axis that is perpendicular to the dielectric substrates.

6. The electronic module as claimed in claim 5, wherein the electrical connections become permanent after a predefined magnetic field and temperature are applied.

7. The electronic module as claimed in claim 5, wherein said electrical connections are temporary and last only as long as a magnetic field is applied.

8. The electronic module as claimed in claim 1, wherein said spacer comprises conductive vias the ends of which are connected to first and second electrical connection pads by means of an anisotropic conductive adhesive that conducts electricity only in a direction that is perpendicular to the substrates.

9. The electronic module as claimed in claim 1, wherein said first dielectric substrate comprises, on its outer face, which is turned toward the outside of the module, a contact terminal block, in particular according to ISO standard 7816, the contacts being connected to the first connection pads by conductive tracks that are integrated into the first substrate.

10. The electronic module as claimed in claim 1, wherein said first dielectric substrate comprises, on its inner face, which is turned toward the inside of the module, an antenna the ends of which are connected to the connection pads of a radiofrequency interface of the first microelectronic chip.

11. The electronic module as claimed in claim 1, wherein said second substrate comprises, on its outer face, a display screen and wherein said second microelectronic chip is a controller that is able to control said display screen.

12. The electronic module as claimed in claim 1, wherein said second substrate comprises a sensor, in particular a biometric sensor, and wherein said second microelectronic chip is a controller that is able to control said sensor.

13. A chip card, comprising a card body that is provided with a through-cavity, and an electronic module as claimed in claim 1, which is fastened in said cavity so as to exhibit, on one of the faces of the chip card, a face of the first substrate and, on the other face of the chip card, a face of the second substrate.

14. A chip card, comprising a card body that is provided with a blind cavity exhibiting a transparent bottom, and an electronic module as claimed in claim 1, which is fastened in said cavity so as to exhibit, on one of the faces of the chip card, a face of the first substrate and, on the other face of the chip card, a face of the second substrate that is visible through the transparent bottom.

* * * * *